United States Patent [19]

Ceska et al.

[11] Patent Number: 5,298,562

[45] Date of Patent: Mar. 29, 1994

[54] CALCIUM DI(METH)ACRYLATE CURED HALOGENATED POLYETHYLENE POLYMERS

[75] Inventors: Gary W. Ceska; C. Richard Costin, both of West Chester; Thomas W. Hazell, Swarthmore; Walter R. Nagel, West Chester; Albert S. Tuccio, Exton, all of Pa.

[73] Assignee: Sartomer Company, Inc., Exton, Pa.

[21] Appl. No.: 747,760

[22] Filed: Aug. 19, 1991

[51] Int. Cl.$^5$ ............................................ C08F 275/00
[52] U.S. Cl. .................................... 525/244; 525/263; 525/274; 524/721; 524/851
[58] Field of Search .................... 525/263, 274, 244; 524/721, 851

[56] References Cited

U.S. PATENT DOCUMENTS

| | | | |
|---|---|---|---|
| 3,823,122 | 7/1974 | Schuh et al. | 525/301 |
| 4,056,269 | 11/1977 | Pollitt et al. | 273/218 |
| 4,178,423 | 12/1979 | Anderson et al. | 526/240 |
| 4,191,671 | 3/1980 | Kataoka et al. | 525/445 |
| 4,264,075 | 4/1981 | Miller et al. | 273/235 |
| 4,483,537 | 11/1984 | Hanada et al. | 273/220 |
| 4,500,466 | 2/1985 | Hayes et al. | 260/429 |
| 4,713,409 | 12/1987 | Hayes et al. | 524/518 |
| 4,720,526 | 1/1988 | Roland | 525/273 |
| 4,824,899 | 4/1989 | Yasuda | 824/495 |
| 4,843,114 | 6/1989 | Touchet et al. | 524/87 |
| 4,918,144 | 4/1990 | Fukuda et al. | 525/263 |
| 4,955,966 | 9/1990 | Yuki et al. | 273/218 |
| 5,137,976 | 8/1992 | Oberster et al. | 525/274 |
| 5,143,957 | 9/1992 | Hashimoto et al. | 525/274 |

FOREIGN PATENT DOCUMENTS 1091818 11/1967 United Kingdom .

OTHER PUBLICATIONS

Dontsov, A. A. "Elastic Properties and Structures of Polybutadiene Vulcanized With Magnesium Methacrylate: Journal of Applied Polymer Science", 16:505–18, 1972.

Dontsov, A. A., "General Regularities of Heterogeneous Vulcanization, Rubbercon 1977: International Rubber Conference", 2:26-1-26-12, 1977.

*Primary Examiner*—John Kight, III
*Assistant Examiner*—Rachel Johnson
*Attorney, Agent, or Firm*—James A. Drobile; Lois A. Gianneschi

[57] ABSTRACT

Free radical-curable halogenated polyethylene polymer compositions, which are crosslinked with the aid of a crosslinking monomer selected from the group consisting of calcium diacrylate and calcium dimethacylate coagents and, optionally an alkyl aminoalkyl phenol vulcanization inhibitor, are provided. The compositions of the invention yield cured rubber articles with markedly improved tensile strength and scorch resistance. Processes for producing a cured rubber article from the disclosed free radical-curable elastomeric compositions and cured compositions prepared from such curable compositions are also provided.

33 Claims, No Drawings

CALCIUM DI(METH)ACRYLATE CURED HALOGENATED POLYETHYLENE POLYMERS

FIELD OF INVENTION

This invention relates to the improved curing of halogenated polyethylene polymer compositions through the use of calcium di(meth)acrylate coagents and, in particular, to cured halogenated polyethylene polymer compositions having high tensile strength and improved scorch resistance in which vulcanization is accomplished with an organic peroxide and a calcium di(meth)acrylate coagent.

STATEMENT OF RELATED ART

Non-sulfur cured elastomeric compositions have typically suffered from poor mechanical properties compared to sulfur-cured elastomers.

Curable elastomeric compositions containing various rubbery elastomeric polymers and certain metal acrylates and methacrylates or metal diacrylates and metal dimethacrylates (hereinafter sometimes referred to as "metal (meth)acrylates" or "di(meth)acrylates"), including zinc di(meth)acrylate and magnesium di(meth)acrylate, which may be cured with organic peroxides, as well as cured rubber compositions formed from such compositions, are generally known in the art, as illustrated by the following patents and publications.

U.S. Pat. No. 4,918,144 to Fukuda et al relates to vulcanizable nitrile rubber compositions having improved tensile strength properties, comprising a highly saturated nitrile elastomer derived from an ethylenically unsaturated nitrile and a conjugated diene, optionally another monomer copolymerizable therewith, an organic peroxide and zinc dimethacrylate.

U.S. Pat. Nos. 4,500,466 and 4,713,409 to Hayes et al relate to vulcanizable polymeric compositions having improved strength and hysteresis properties, comprising rubbery polymers selected from the group consisting of natural rubber, ethylene/propylene copolymers, ethylene/propylene/diene terpolymers, styrene/butadiene copolymers, nitrile rubbers, neoprene and blends thereof with zinc dimethacrylate and a cure effective amount of a peroxide curing agent.

The use of magnesium methacrylate to cure cis-1,4-polybutadiene elastomers is described in the article entitled "Elastic Properties and Structures of Polybutadiene Vulcanized with Magnesium Methacrylate" appearing in the Journal of Applied Polymer Science, Vol. 16, pages 505–518 (1972). Similarly, the article entitled "General Regularities of Heterogeneous Vulcanization" by A. A. Dontsov, appearing in Rubbercon '77, International Rubber Conference, Volume 2, pages 26-1 through 26-12 (1977) describes vulcanizable compositions comprising styrene-butadiene rubber or ethylene-propylene rubber cured with a magnesium, sodium, zinc or cadmium salt of methacrylic, maleic or betaphenyl acrylic acids, together with free radical initiators such as dioumyl peroxide. Further, a proposed mechanism for the interaction of sodium methacrylate and magnesium methacrylate with styrene-butadiene elastomers is postulated in an article entitled "Vulcanization of Rubbers by Salts of Unsaturated Acids, Vulcanization of Butadiene-Styrene Rubber by Methacrylate Salts" appearing in the Colloid Journal USSR, Vol 31, pp. 293–297 (1969).

Curable SBR or neoprene elastomeric compositions employing acid salts of substituted acrylic acid are disclosed in U.S. Pat. No. 3,823,122, with the preferred acid salt being zinc methacrylate.

U.S. Pat. No. 4,720,526 to Roland describes curable rubber compositions comprising a natural rubber, neoprene, a nitrile rubber or blends thereof with a metal dimethacrylate selected from the group consisting of zinc dimethacrylate or magnesium dimethacrylate together with a peroxide curing agent.

U.S. Pat. No. 4,843,114 to Touchet et al discloses in its Example a rubbery composition comprising a hydrogenated nitrile elastomer, zinc oxide, zinc methylmethacrylate resin, 1,2-dihydro-2,2,4-trimethylquinoline, carbon black and dicumyl peroxide to yield cured rubbers having high tensile strength.

U.S. Patent No. 4,824,899 to Yasuda discloses sulfur-cured compositions of high elasticity, extension and fatigue resistance comprising a natural rubber or blend of natural rubber with a synthetic diene together with sulfur, a vulcanization accelerator, carbon black and a metal salt of acrylic acid including aluminum acrylate, zinc acrylate, nickel acrylate, cobalt acrylate, lead acrylate, iron acrylate, manganese acrylate, barium acrylate, calcium acrylate and magnesium acrylate.

U.S. Pat. No. 4,178,423 to Anderson et al describes the suspension or emulsion polymerization of vinyl chloride monomers carried out in the presence of mixtures of zinc and calcium acrylates to yield thermally stable products.

British Patent No. 1,091,818 to Taylor describes cured rubbery poly(alpha-olefins) from mixtures of at least one alpha-olefin, an organic peroxide curing agent and a metal salt of acrylic or methacrylic acid, including zinc methacrylate, zinc diacrylate and zinc dimethacrylate as well as other metallic salts such as magnesium, calcium, barium, titanium, vanadium, chromium, iron, cobalt, nickel, cadmium, lead, tin, zinc or aluminum.

Compositions for the outer covers of golf balls comprising an ionomeric resin which consists of a metallic salt of ethylene and unsaturated carboxylic acid and a metallic salt selected from a group consisting of metal acrylates or methacrylates, and including a second metal (meth)acrylate, wherein at least one metal (meth)acrylate is magnesium acrylate, magnesium methacrylate, calcium acrylate, calcium methacrylate, zinc acrylate, zinc methacrylate, aluminum acrylate and aluminum methacrylate are disclosed in U.S Pat. No. 4,483,537 to Hanada et al.

Homogeneous or two-piece molded golf balls made from a composition of cis-polybutadiene and a metal-containing cross-linking monomer are described in U.S Pat. Nos. 4,056,269 to Pollitt et al and 4,264,075 to Miller et al. The metal-containing, cross-linking monomers are described as zinc, magnesium, calcium, lithium, sodium, potassium, cadmium, lead, barium, zirconium, beryllium, copper, aluminum, tin, iron, antimony and bismuth salts, or mixtures thereof, of homopolymerizable or copolymerizable monomers, including acrylic and methacrylic acids. The (meth)acrylate salts are either added or formed in situ.

Other abrasion-resistant peroxide-cured rubber compositions employing natural rubber or homopolymeric elastomers of conjugated dienes such as 1,3-butadiene, isoprene, chloroprene and copolymeric elastomers of the conjugated dienes with vinyl-substituted aromatic hydrocarbons such as styrene, alpha-methyl-styrene and vinyltoluene, and mixtures thereof, polymerized with an alpha-beta-ethylenically unsaturated carboxylic acid and a divalent metal compound, together with an organic peroxide, are disclosed in U.S. Pat. No. 4,191,671 to Kataoka et al. Disclosed metal-containing compounds include oxides, hydroxides and carbonates of zinc, magnesium, calcium, iron and cobalt, and alpha-beta-ethylenically unsaturated carboxylic acids, including acrylic and methacrylic acids.

Further golf ball compositions employing peroxide-cured butadiene, styrene-butadiene, isoprene, and trans-polyisoprene elastomers as well as ionomeric resins, fine inorganic fibers treated with a specified surface treating agent prior to mixing with the elastomers, and which compositions may optionally contain cross-linking monomers, are disclosed in U.S. Pat. No. 4,955,966 to Yuki et al. The metal-containing, cross-linking monomers include various salts of unsaturated carboxylic acids, for example, metallic salts of acrylic and methacrylic acids, including lithium, sodium, potassium, strontium, zinc, magnesium, calcium, barium, cadmium, lead, zirconium, beryllium, copper, aluminum, tin, iron, antimony, bismuth, molybdenum, tungsten and nickel salts, alone or in combination. Specific examples in the foregoing patent employ zinc acrylate and calcium methacrylate as crosslinking coagents with the foregoing elastomers and the specified surface-treated inorganic fibers. A wide variety of other synthetic elastomers are generically disclosed as utilizable with the identified formulation constituents, including nitrile, chloroprene, butyl, acrylic, urethane, silicone, fluorocarbon, ethylene-propylene, chlorosulphonated polyethylene, ethylene-vinyl acetate, chlorinated polyethylene, polyisobutylene, alfin, polyester, epichlorohydrin, chlorinated isobutylene-isoprene, and nitrile-isobutylene rubbers.

As is evident from the foregoing patents, various cross-linking coagents have been used with peroxide-curable elastomers. The coagents make the curing process more efficient thus leading to an improved cure, as manifested by the cured rubbers having improved physical properties. Differences in coagent performance such as price, handling characteristics, physical properties achieved, scorch time, etc. means one coagent can not yield optimum performance in all performance areas. The present invention describes an improved coagent curing system for certain halogenated polyethylene elastomers.

This invention relates to an improved method for curing halogenated polyethylene polymers such as chlorinated polyethylene and chlorosulfonated polyethylene. These elastomers can be cured by a variety of methods including peroxide/coagent cure, radiation cure and thiadiazole cure. These cured elastomers exhibit good chemical resistance and heat resistance.

SUMMARY OF THE INVENTION

An object of the present invention is to provide an improved free radical curable composition having good chemical and heat resistance comprising a halogenated polyethylene polymer crosslinked with a calcium di(-meth)acrylate crosslinking agent.

Another object of the present invention is to provide free radical curable compositions having improved tensile strength and improved scorch resistance during curing comprising crosslinked halogenated polyethylene copolymers for applications requiring high tensile strength.

Yet another object of the present invention is to provide new and improved processes for the preparation of free radical curable calcium di(meth)acrylate crosslinked halogenated polyethylene copolymers.

The foregoing objectives are achieved in one aspect of the invention in which a halogenated polyethylene polymer is crosslinked with the aid of a calcium di(-meth)acrylate coagent (calcium diacrylate or calcium dimethacrylate), and a free-radical generating compound to yield a cured polymer having markedly improved tensile strength and improved scorch resistance during curing over other prior art compositions employing different crosslinking coagents.

Accordingly, the present invention pertains to curable compositions, cured compositions produced by and the method of curing a blend comprising, consisting of, or consisting essentially of:

(a) about 100 parts by weight of a halogenated polyethylene polymer, preferably selected from the group consisting of chlorinated polyethylene and chlorosulfonated polyethylene;

(b) a crosslinking-effective amount (broadly about 0.1 to about 50 parts and preferably about 1 to about 10 parts by weight per 100 parts by weight of the halogenated polyethylene polymer) of a crosslinking monomer selected from the group consisting of calcium diacrylate and calcium dimethacrylate; and (c) a cure-effective amount (broadly about 0.1 to about 15 parts and preferably about 1 to about 10 parts by weight per 100 parts by weight of the halogenated polyethylene polymer) of a free radical-generating compound (preferably an organic peroxide, and most preferably a di-tertiary alkyl peroxide).

In another aspect of the invention, curable compositions, cured compositions produced by, and the method of curing compositions having improved scorch characteristics during a free radical curing process are achieved utilizing a composition comprising, consisting of, or consisting essentially of:

(a) about 100 parts by weight of a halogenated polyethylene polymer, preferably selected from the group consisting of chlorinated polyethylene and chlorosulfonated polyethylene;

(b) a crosslinking-effective amount (broadly about 0.1 to about 50 parts and preferably about 1 to about 10 parts by weight per 100 parts by weight of the halogenated polyethylene polymer) of a crosslinking monomer selected from the group consisting of calcium diacrylate and calcium dimethacrylate; and (c) a cure-effective amount (broadly about 0.1 to about 15 parts and preferably about 1 to about 10 parts by weight per 100 parts by weight of the halogenated polyethylene polymer) of a free radical-generating compound (preferably an organic peroxide, and most preferably a di-tertiary alkyl peroxide).

(d) optionally, a vulcanization inhibitor corresponding to the formula:

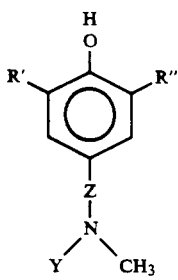

[Formula 1]

wherein R' and R" are each independently lower alkyl of about 1 to 6 carbon atoms, Z is an alkylene radical containing from 1 to 12 carbon atoms and Y is a member selected from the group consisting of an alkyl, cycloalkyl, aryl, alkaryl and aralkyl radical, such radical containing from 1 to 12 carbon atoms, or a lower alkyl substituted derivative of said aryl radicals containing 1 to 60 carbon atoms in the alkyl chain, said inhibitor being present in an amount of about 0.01 to about 5 parts by weight per 100 parts by weight of the halogenated polyethylene polymer, and which preferably is 2,6-di-t-butyl-alpha-dimethylamino-p-cresol.

Another aspect of the present invention is a method for providing a rubber article formed from a halogenated polyethylene polymer, having improved tensile strength and improved scorch resistance, by vulcanizing either aspect of the present invention set forth above.

DESCRIPTION OF THE PREFERRED EMBODIMENTS

Halogenated Polyethylene Polymers

The term "halogenated polyethylene polymers", as used herein, is intended to include, without limitation, chlorinated polyethylene (CPE) or chlorosulfonated polyethylene (CSM). CPE and CSM polymers are commercially available and their chlorine content is variable. Chlorinated polyethylene rubbers, for example Tyrin 0136 TM manufactured by Dow Chemical Co, are generally prepared by the random chlorination of high density polyethylene. The elastomers are generally recognized to have excellent ozone, weather, and heat resistance. Chlorosulfonated polyethylenes, for example Hypalon TM manufactured by DuPont, may contain varying amounts of chlorine (generally 27–45 weight percent) and sulfur (generally 1.0–1.4 weight percent). These rubbers are known in the art to possess good color stability and resistance to weathering and ozone.

It is known in the art that the halogenated polyethylene polymers can be cured by a variety of methods including peroxide/coagent cure, radiation cure, and thiadiazole cure. The present invention utilizes a peroxide/coagent cure in which the use of an organic peroxide and calcium di(meth)acrylate coagents (calcium diacrylate or calcium dimethacrylate) results in improved tensile properties and scorch times for the cured halogenated polyethylene polymers.

Standard fillers and additives can be used to achieve specific end use properties associated with each additive. Examples of these additives include: silica; carbon black; colorants; plasticizers; antioxidants; accelerators; and other nonreacting additives normally used in rubber formulations.

Vulcanizing Agent

Vulcanizing agents that decompose to produce free radicals during the curing cycle may be employed as curing agents in the present invention. The free radical-generating compound advantageously employed in the present invention is a ditertiary alkyl peroxide, dicumyl peroxide (DICUP TM).

Ditertiary peroxide curing compounds are generally preferred, which peroxides and their homologs and analogs, all correspond essentially to the structural formula shown in Formula 2 below:

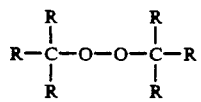

[Formula 2]

These ditertiary peroxide agents contain at least one peroxy group disposed between tertiary carbon atoms, which tertiary carbon atoms are linked to carbon atoms constituting portions of each of the R groups, which R groups may be alkyl (including straight, branched or cyclic) alkenyl or aryl groups, or mixtures of such groups, and which R groups may be further substituted by non-hydrocarbon groups, for example, ethers, additional peroxy groups, or halogen, such as chlorine, and which organic peroxides do not interfere with either the curing process or the cured elastomeric product.

Illustrative organic peroxides include diacetyl peroxide, dibenzoyl peroxide, dicapryl peroxide, di-(p-chloro-benzoyl) peroxide, didecanoyl peroxide, di-(2,4-dichlorobenzoyl) peroxide, diisobutyl peroxide, diisononanoyl peroxide, dilauroyl peroxide, dipelargonyl peroxide, dipropynyl peroxide, di($\beta$-carboxypropinoyl) peroxide, methyl ethyl ketone peroxide, cyclohexanone peroxide, dihydroxy-dimethyl-dioxacyclopentane, t-butyl peroxide, t-butyl peroxy(2-ethylhexanoate), t-butylperoxyisobutylate, O,O-t-butyl-O-isopropyl-monoperoxy-carbonate, t-butylperoxypivalate, dimethyl-di(benzoylperoxy)-hexane, t-butyl-peroxy(2-ethylbutylate), di-t-butyl peroxide, dicumyl peroxide, 2,5-bis(t-butylperoxy)-2,5-dimethylhexane, t-butyl hydroperoxide, cumyl hydroperoxide, a,a'-bis--(t-butylperoxy)diisopropyl benzene, 1,1-di-t-butyl-peroxy-3,3,5-trimethycyclohexane and n-butyl-bis(t-butylperoxy)-valerate and the like. Among the foregoing free radical-generatng compounds mentioned above, dicumyl peroxide, (DICUP TM), 1,1-di-t-butyl-peroxy-3,3,5-trimethylcyclohexane, di-t-butyl peroxide (both available from AKZO Chemicals, Inc. of Chicago, Ill.), 2,5-dimethyl-2,5-di[t-butylperoxy]-2 hexane, (VAROX DBPH 50 TM) 2,5-dimethyl-2,5-di-t-butyl-peroxy-3-hexyne (LUPERSOL 130 TM), and a,a'-bis-(t-butylperoxy)-diisopropyl benzene (VULCUP R TM) are commercially available and conveniently used. The foregoing organic peroxides may be used alone or in combinations.

The amount of the free radical-generating compound used in the present invention may be varied depending on the halogenated polyethylene polymer and cross-linking coagent selected. Hence, the required amount of free radical-generating compound required to practice the present invention is a cure-effective amount readily ascertainable by one of ordinary skill in the art. Generally, an amount of about 0.1 to about 15 parts per hundred parts of the halogenated polyethylene polymer are employed. Preferably, amounts of about 1 to about 10 parts by weight per hundred parts by weight of the halogenated polyethylene polymer are used.

Coagents

The present invention is based on the unexpected discovery that the calcium diacrylate crosslinking coagent, employed in the curable compositions described herein, yield markedly improved tensile strength and scorch resistance of the cured halogenated polyethylene polymer compounds. Such results are surprising because non-sulfur cured halogenated polyethylene elastomeric compositions have typically suffered from poor mechanical properties compared to sulfur-cured elastomers.

In the present invention, a calcium diacrylate crosslinking coagent was advantageously employed with halogenated polyethylene polymers to yield cured rubbers having markedly improved tensile strength. This tensile strength was significantly higher than that which resulted with the use of, for example, a zinc diacrylate coagent. Halogenated polyethylene polymers cured with calcium dimethacrylate would have been expected to demonstrate equivalent tensile strength to such polymers cured with other metallic dimethacrylates based upon the effects of such metallic dimethacrylate on other prior art polymers. However, calcium dimethacrylate has resulted in an unexpected and surprising improvement in the tensile strength of halogenated polyethylene polymers and with the crosslinking agent.

In addition, use of a calcium diacrylate crosslinking coagent unexpectedly resulted in a cured composition having improved scorch safety. Such a result was surprising because coagents normally increase the speed of the cure. This increased speed, generally, reduces the scorch safety of the system.

The amount of calcium di(meth)acrylate to be used as a crosslinking coagent in the present invention is not critical. Generally, amounts of about 0.1 parts to about 50 parts by weight per 100 parts by weight of the halogenated polyethylene polymer may be used. Preferably, amounts of about 1 to about 10 parts by weight per 100 parts of the halogenated polyethylene polymer are used.

The calcium diacrylate employed in the present invention is dispersable in the polymer base. Calcium dimethacrylate may also be used as a coagent. However, the resultant improvement in tensile strength with calcium dimethacrylate, although higher than that resulting from the use of zinc diacrylate as a crosslinking coagent, is less than the improvement achieved when calcium diacrylate is utilized. Use of calcium dimethacrylate does, however, result in a slightly greater improvement in scorch safety than when calcium diacrylate is utilized as the crosslinking coagent.

Vulcanization Inhibitor

Optionally a modifier-retarder compound may be added to the composition in order to further minimize scorching of the elastomer during free radical vulcanization of the composition. The use of certain alkyl aminoalkyl phenols as modifier-retarder agents i.e. as vulcanization inhibitors, in a variety of elastomeric compositions has heretofore been taught in U.S. Pat. No. 4,857,571, which is incorporated herein by reference. The alkyl aminoalkyl phenol retarders effectively retard scorching of the cured elastomer and confer certain antioxidant properties, while eliminating many safety and efficacy concerns of the prior art scorch retardant compounds.

The alkyl aminoalkyl retarders that may advantageously be employed in the compositions of the present invention correspond to the following structural formula:

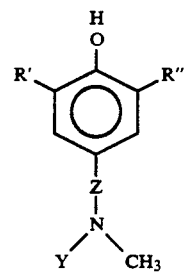

[Formula 3]

wherein R' and R" are each independently lower alkyl of from about 1 to 6 carbon atoms, Z is an alkylene radical containing from 1 to 12 carbon atoms, and Y is a member selected from the group consisting of an alkyl, cycloalkyl, aryl, alkaryl, aralkyl radical, such radical containing from 1 to 12 carbon atoms (or a lower alkyl-substituted derivative of said aryl radicals containing from 1 to 6 carbon atoms in the alkyl chain), said inhibitor being present in an amount of from about 0.01 to about 5 parts by weight per 100 parts by weight of elastomer.

Preferred retarders of the present invention are compounds conforming to the structural formula shown as Formula 3 above, wherein R' and R" are each tertiary alkyl hydrocarbons, Z is an alkylene radical containing from 1 to 3 carbon atoms, i.e., methylene, ethylene and propylene radicals, and Y is a lower alkyl radical containing from 1 to 6 carbon atoms. A retarder employed in the present invention which is most preferred is 2,6-di-t-butyl-alpha-dimethylamino-p-cresol available as ETHANOX 703 from Ethyl Corporation of Baton Rouge, La. It is further understood that mixtures of the foregoing retarders are within the scope of the present invention.

Additional representative compounds of the retarders that may be employed in the present invention include:
2,6-dimethyl-4-[methyl(ethyl)amino]methyl phenol
2,6-diethyl-4-[dimethylamino]methyl phenol
2,6-di-t-butyl-4-[dimethylamino]ethyl phenol
2,6-di-t-amyl-4-[dimethylamino]ethyl phenol
2,6-di-t-butyl-4-[methyl(cyclohexyl)amino]methyl phenol
2,6-di-t-butyl-4-[methyl(phenyl)amino]n-propyl phenol
2,6-di-t-amyl-4-[methyl(benzyl)amino]ethyl phenol
2,6-di-t-butyl-4-[methyl(4-t-butylphenyl)amino]n-butyl phenol
2,6-di-n-propyl-4-[methyl(4-t-butylbenzyl)amino]n-propyl phenol
2,6-di-t-butyl-4-[dimethylamino]n-hexyl phenol.

The modifier-retarder alkyl-substituted aminoalkyl phenol compounds described herein may generally be added to the compositions of the present invention in amounts between about 0.01 to about 5 parts, preferably about 0.1 to about 2 parts, per 100 parts by weight of the halogenated polyethylene elastomer to be cured.

Without departing from the scope of the present invention, and as appreciated by those skilled in the art, inert fillers may desirably be included in the curable compositions of the invention. If an inert filler is desired, any known or conventional filler which does not interfere with the vulcanization process described herein may be used, and such fillers are desirably in finely-divided form. Suitable fillers include, but are not limited to, the following: silica and silicates, thermal blacks (i.e. furnace, channel or lamp carbon black), clays, kaolin, diatomaceous earth, zinc oxide, cork, titania, cotton floc, cellulose floc, leather fiber, plastic fiber, plastic flour, leather flour, fibrous fillers such as glass and synthetic fibers, metal oxides and carbonates and talc. The amount of inert filler is dictated by its type and the intended end-use of the composition, and, in general, may be less than about 30 parts by weight per 100 parts by weight of halogenated polyethylene polymer, and more preferably, less than about 15 parts.

Other additives that may be added to the curable compositions of the present invention, depending upon the intended end-use of the cured rubber, include antioxidants, UV stabilizers, antiozonants, plasticizers, mold release agents, tackifiers, anti-tack agents, dispersants, solvents, softening agents, fatty acids such as stearic acid, processing aids, coloring agents and the like.

The aforementioned ingredients are mixed and cured by any of the conventional means. Mixing may be accomplished by charging the ingredients to a Banbury mixer or a rubber mixing mill and intimately mixing the ingredients until the composition is uniform. Thereafter the unvulcanized composition is removed from the mill or mixer and then may be preformed through an extruder. The extruded unvulcanized composition then can be cut to size, molded and cured. Reaction temperatures and pressures should be sufficient to melt the reactants and to thermally decompose the free radical-generating compound. Thus, the selection of the reaction temperature will be predicated upon the halogenated polyethylene polymer, coagent and free radical-generating compound that is selected. The temperatures useful in the present invention may vary between wide limits such as from 90° C. to 250° C. and preferably from about 138° F. to about 215° F.

The invention will be further clarified by a consideration of the following examples, which are intended to be purely exemplary of the use of the invention.

EXAMPLES

In the following Table 1, all of the ingredients are expressed in parts by weight (unless otherwise noted) and each column corresponds to a numbered example.

EXAMPLE 1

As a control formulation, a batch of chlorinated polyethylene (CPE) polymer, available as Tyrin ™ 0136, was masticated on a two roller mill until an acceptable bead was established in the conventional manner. Thereafter, for each 100 parts of CPE, and in accordance with the recipe listed on Table 1, 5 parts of dicumyl peroxide (DICUP ™ 40 KE) was added to the flux roll and the band was cut and mixed ten times, on each side, on the mill until a uniform, smooth band was developed. Thereafter, the compound strip was cut, compression molded, and cured for 20 minutes at 320° F.

Tensile specimens were cut from the molded compound and tested on a Thwing Albert tensile tester in accordance with ASTM D 412. Modulus values were recorded in accordance with ASTM D 412. Shore A hardness values were obtained in accordance with ASTM D 1415. The results obtained with this control composition may be found reported on Table 1.

EXAMPLES 2-5

Rubber compositions were produced by repeating the procedure of Example 1 except that the recipes for Examples 2-5, which may be found on Table 1, were followed. Example 2 involved the addition of 4 parts of a conventional coagent, triallyl isocyanurate (TAIC), to the flux roll. Example 3 involved the substitution of 5 parts of calcium dimethacrylate for the triallyl isocyanurate coagent of Example 2. Examples 4 and 5 involved the substitution of an equal weight of calcium diacrylate and zinc diacrylate, respectively, for the calcium dimethacrylate of Example 3. Tensile strength, modulus, and hardness, Shore A values for these vulcanized rubber compositions may be found on Table 1.

TABLE 1

| Formulation | EXAMPLES Example No. | | | | |
|---|---|---|---|---|---|
| | 1 | 2 | 3 | 4 | 5 |
| Tyrin 0136 CPE | 100 | 100 | 100 | 100 | 100 |
| Calcium diacrylate | — | — | — | 5 | — |
| Calcium dimethacrylate | — | — | 5 | — | — |
| Triallyl isocyanurate | — | 4 | — | — | — |
| Zinc Diacrylate | — | — | — | — | 5 |
| Dicumyl Peroxide[1] | 5 | 5 | 5 | 5 | 5 |
| Rheometer, 20 min. @ 320° F. | | | | | |
| Viscosity in-lb | 9.7 | 8.7 | 11.0 | 11.0 | 10.9 |
| ML in-lb[2] | 5.6 | 4.6 | 5.5 | 6.0 | 6.0 |
| TS-1, min[3] | 3.4 | 1.7 | 2.9 | 2.5 | 1.6 |
| TS-2, min | 12.2 | 2.0 | 3.8 | 3.3 | 1.9 |
| TS-5, min | 20.0 | 3.0 | 7.9 | 5.9 | 5.6 |
| TS-90, min | 3.9 | 3.5 | 11.9 | 10.8 | 14.4 |
| MHF, in-lb[4] | 7.6 | 11.6 | 13.8 | 16.0 | 18.9 |
| Hardness Shore A[5] | 41 | 58 | 61 | 60 | 56 |
| Tensile Properties[6] | | | | | |
| Modulus, 100 (psi) | 94 | 150 | 170 | 170 | 180 |
| Modulus, 200 (psi) | 106 | 165 | 195 | 195 | 250 |
| Modulus, 300 (psi) | 116 | 175 | 225 | 225 | 340 |
| Tensile Strength psi | 455 | 1055 | 1180 | 1670 | 530 |
| Elongation, % | 1900 | 1750 | 1605 | 1680 | 500 |

[1]DICUP ™ 40KE brand dicumyl peroxide available from Hercules, Inc. of Wilmington, Delaware.
[2]Minimum ODR Torque.
[3]Scorch times.
[4]Maximum ODR Torque.
[5]ASTM D 1415 procedure.
[6]ASTM D 412-87 procedure. 72° F.

As is apparent from the data reported on Table 1, use of calcium diacrylate as the crosslinking coagent produced a marked increase in tensile strength and good hardness results for the peroxide-cured CPE/calcium diacrylate composition in Example 4. This marked increase in crosslink density was neither seen in the control formulation of Example 1 nor the comparative formulation of Examples 2, 3 and 5 in which other crosslinking coagents were substituted for the calcium diacrylate. However, the peroxide-cured CPE/calcium dimethacrylate composition of Example 3 did demonstrate an increase in tensile strength and good hardness in comparison to the compositions of Examples 1, 2 and 5.

The unexpected nature of the effect of the calcium diacrylate and calcium dimethacrylate coagents upon the physical properties of the present invention is demonstrated by the poorer mechanical properties resultant in examples 2 and 5 in which triallyl isocyanurate and zinc diacrylate were utilized as the crosslinking coagents.

Other embodiments of the invention will be apparent to those skilled in the art from a consideration of this specification or practice of the invention disclosed herein. It is intended that the specification and examples be considered as exemplary only, with the true scope and spirit of the invention being indicated in the following claims.

We claim:

1. A curable elastomer composition comprising:
   (a) a halogenated polyethylene polymer;
   (b) a crosslinking-effective amount of a crosslinking monomer selected from the group consisting of calcium diacrylate and calcium dimethacrylate; and
   (c) a cure-effective amount of a free radical-generating compound.

2. The composition of claim 1, wherein the crosslinking monomer is present in an amount between about 0.1 to about 50 parts by weight per 100 parts by weight of the halogenated polyethylene polymer.

3. The composition of claim 1, wherein the free radical-generating compound is present in an amount between about 0.1 to about 15 parts by weight per 100 parts by weight of the halogenated polyethylene polymer.

4. The composition of claim 1, wherein the crosslinking monomer is present in an amount between about 0.1 to about 50 parts by weight per 100 parts by weight of the halogenated polyethylene polymer and the free radical-generating compound is present in an amount between about 0.1 to about 15 parts by weight per 100 parts by weight of the halogenated polyethylene polymer.

5. The composition of claims 1, 2, 3, or 4, wherein the halogenated polyethylene polymer is selected from the group consisting of chlorinated polyethylene and chlorosulfonated polyethylene.

6. The composition of claim 5, wherein the halogenated polyethylene is chlorinated polyethylene.

7. The composition of claim 5, wherein the halogenated polyethylene is chlorosulfonated polyethylene.

8. The composition of claim 6, wherein the crosslinking monomer is calcium diacrylate.

9. The composition of claim 7, wherein the crosslinking monomer is calcium diacrylate.

10. The composition of claim 6, wherein the crosslinking monomer is calcium dimethacrylate.

11. The composition of claim 7, wherein the crosslinking monomer is calcium dimethacrylate.

12. The composition of claim 6, wherein the free radical-generating compound is an organic peroxide.

13. The composition of claim 7, wherein the free radical-generating compound is an organic peroxide.

14. The composition of claim 12, wherein the free radical-generating compound is a di-tertiary alkyl peroxide.

15. The composition of claim 14, wherein the ditertiary alkyl peroxide is dicumyl peroxide.

16. The composition of claims 3 or 4, wherein the free radical-generating compound is present in an amount of about 1 part to about 10 parts by weight per 100 parts by weight of said halogenated polyethylene polymer.

17. The composition of claim 1, wherein the free radical-generating compound is present in an amount of about 1 part to about 10 parts by weight per 100 parts by weight of said halogenated polyethylene polymer.

18. The composition of claims 2, 3 or 4, wherein the crosslinking monomer is present in an amount of about 1 part to about 10 parts by weight per 100 parts by weight of the halogenated polyethylene polymer.

19. The composition of claim 1, wherein the crosslinking monomer is present in an amount of about 1 part to about 10 parts by weight per 100 parts by weight of the halogenated polyethylene polymer.

20. A cured elastomer compound provided by curing the compositions of claims 1, 2, 3 or 4.

21. A cured elastomer compound provided by curing the compositions of claim 5.

22. A cured elastomer compound provided by curing the composition of claim 6.

23. A curable elastomer composition comprising:
   (a) a halogenated polyethylene polymer;
   (b) about 0.1 to about 50 parts by weight of a cross linking monomer selected from the group consisting of calcium diacrylate and calcium dimethacrylate per 100 parts of halogenated polyethylene polymer;
   (c) a free radical-generating compound present as a curing agent in an amount between about 0.1 to about 15 parts by weight per 100 parts by weight of the halogenated polyethylene polymer; and
   (d) a vulcanization inhibitor corresponding to the formula:

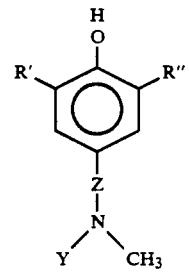

wherein R' and R" are each independently lower alkyl of about 1 to 6 carbon atoms, Z is an alkylene radical containing from 1 to 12 carbon atoms, and Y is a member selected from the group consisting of an alkyl, cycloalkyl, aryl, alkaryl and aralkyl radical, said radical containing from 1 to 12 carbon atoms, and lower alkyl substituted derivatives of said aryl radicals containing 1 to 6 carbon atoms, said inhibitor being present in an amount of from about 0.01 to about 5 parts by weight per 100 parts by weight of the halogenated polyethylene polymer.

24. The composition of claim 23, wherein the halogenated polyethylene is selected from the group consisting of chlorinated polyethylene and chlorosulfonated polyethylene.

25. The composition of claim 24, wherein the halogenated polymer is chlorinated polyethylene.

26. The composition of claim 25, wherein the crosslinking monomer is calcium diacrylate.

27. The composition of claim 24, wherein the free-radical generating compound is an organic peroxide.

28. The composition of claim 27, wherein the free radical-generating compound is a di-tertiary alkyl peroxide.

29. The composition of claim 28, wherein the ditertiary alkyl peroxide is dicumyl peroxide.

30. A cured elastomeric composition provided by curing the composition of claims 23 or 24.

31. A method of providing a cured rubber article, which comprises the step of molding the rubber article from a vulcanized product comprising:
(a) a halogenated polyethylene polymer;
(b) a crosslinking-effective amount of a crosslinking monomer selected from the group consisting of calcium diacrylate and calcium dimethacrylate; and
(c) a cure-effective amount of a free radical-generating compound.

32. A method of providing a cured rubber article, which comprises the step of molding the rubber article from a vulcanized product comprising:
(a) about 100 parts by weight of chlorinated polyethylene;
(b) about 0.1 parts by weight to about 50 parts by weight per 100 parts by weight of said chlorinated polyethylene of calcium diacrylate; and
(c) An organic peroxide curing agent in an amount of about 0.1 parts by weight to about 15 parts by weight per 100 parts by weight of said chlorinated polyethylene.

33. A method of providing a cured rubber article, which comprises the step of molding the rubber article from a vulcanized product comprising:
(a) a halogenated polyethylene polymer;
(b) a crosslinking-effective amount of a crosslinking monomer selected from the group consisting of calcium diacrylate and calcium dimethacrylate;
(c) a cure-effective amount of a free radical-generating compound and;
(d) a vulcanization inhibitor corresponding to the formula:

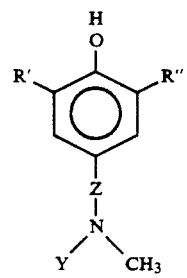

where R' and R" are each independently lower alkyl of about 1 to 6 carbon atoms, Z is an alkylene radical containing from 1 to 12 carbons, and Y is a member selected from the group consisting of an alkyl, cycloalkyl, aryl, alkaryl and aralkyl radical, said radical containing from 1 to 12 carbon atoms, and lower alkyl substituted derivatives of said aryl radicals containing 1 to 6 carbon atoms, said inhibitor being present in an amount of from about 0.01 to about 5 parts by weight, per 100 parts by weight of the halogenated polyethylene polymer.

* * * * *